US010726218B2

(12) United States Patent
Koch et al.

(10) Patent No.: US 10,726,218 B2
(45) Date of Patent: Jul. 28, 2020

(54) METHOD AND APPARATUS FOR RADIO FREQUENCY IDENTIFICATION (RFID) TAG BEARING ESTIMATION

(71) Applicant: SYMBOL TECHNOLOGIES, LLC, Lincolnshire, IL (US)

(72) Inventors: Michael J. Koch, Fort Salonga, NY (US); Guy P. Roberts, Potomac, MD (US); Joon Hwa Chun, Rockville, MD (US)

(73) Assignee: Symbol Technologies, LLC, Holtsville, NY (US)

( * ) Notice: Subject to any disclaimer, the term of this patent is extended or adjusted under 35 U.S.C. 154(b) by 12 days.

(21) Appl. No.: 15/661,469

(22) Filed: Jul. 27, 2017

(65) Prior Publication Data

US 2019/0034673 A1  Jan. 31, 2019

(51) Int. Cl.
G06K 7/10 (2006.01)

(52) U.S. Cl.
CPC ..... *G06K 7/10366* (2013.01); *G06K 7/10099* (2013.01); *G06K 7/10356* (2013.01)

(58) Field of Classification Search
CPC .. G01S 3/28; G06K 7/10366; G06K 7/10099; G06K 7/10356
See application file for complete search history.

(56) References Cited

U.S. PATENT DOCUMENTS

| 4,353,073 | A | 10/1982 | Brunner et al. |
| 5,066,956 | A | 11/1991 | Martin |
| 5,173,703 | A | 12/1992 | Mangiapane et al. |
| 5,181,040 | A | 1/1993 | Inoue et al. |
| 5,859,610 | A | 1/1999 | Lenormand et al. |
| 7,079,035 | B2 | 7/2006 | Bock et al. |
| 7,250,902 | B2 | 7/2007 | Manoogian et al. |
| 7,310,045 | B2 | 12/2007 | Inui |

(Continued)

FOREIGN PATENT DOCUMENTS

| CA | 2615245 A1 | 6/2008 |
| EP | 1758256 A1 | 2/2007 |

(Continued)

OTHER PUBLICATIONS

International Search Report and Written Opinion for International Patent Application No. PCT/US2018/41757 dated Sep. 19, 2018.

(Continued)

*Primary Examiner* — Nabil H Syed
(74) *Attorney, Agent, or Firm* — Yuri Astvatsaturov (57) ABSTRACT

A method of radio frequency identification (RFID) tag bearing estimation comprises: at an RFID tag reader having a plurality of antenna elements, emitting a primary transmit beam; receiving a response signal from an RFID tag via the antenna elements; generating a first set of signal measurements corresponding to a first set of receive beam characteristics, based on a first partition of the response signal; generating a second set of signal measurements corresponding to a second set of receive beam characteristics, based on a second partition of the response signal; and combining the first and second sets of signal measurements, for selection of an estimated tag bearing for the RFID tag from the first and second receive beam characteristics.

22 Claims, 8 Drawing Sheets

(56) References Cited

U.S. PATENT DOCUMENTS

| | | | |
|---|---|---|---|
| 7,403,120 B2 | 7/2008 | Duron et al. | |
| 7,496,329 B2 | 2/2009 | Patel et al. | |
| 7,602,293 B2 | 10/2009 | Taki et al. | |
| 7,646,336 B2 | 1/2010 | Tan et al. | |
| 7,777,609 B2 | 8/2010 | Kuramoto | |
| 7,928,894 B1 | 4/2011 | Fox | |
| 8,115,594 B2 | 2/2012 | Koezuka et al. | |
| 8,248,306 B2 | 8/2012 | Legay et al. | |
| 8,253,570 B1 | 8/2012 | McBride | |
| 8,305,265 B2 | 11/2012 | Ezal et al. | |
| 8,390,458 B2 | 3/2013 | Nonaka et al. | |
| 8,427,370 B2 | 4/2013 | Pozgay | |
| 8,461,965 B2 | 6/2013 | Chen et al. | |
| 8,482,387 B2 | 7/2013 | Iwahashi | |
| 8,493,182 B2 | 7/2013 | Hofer et al. | |
| 8,558,731 B1 | 10/2013 | Woodell | |
| 8,577,308 B2 | 11/2013 | Choi et al. | |
| 8,587,495 B2 | 11/2013 | Faraone et al. | |
| 8,659,430 B2 | 2/2014 | Bloy et al. | |
| 8,952,844 B1 | 2/2015 | Wasiewicz | |
| 9,059,754 B2 | 6/2015 | Zhang et al. | |
| 9,111,190 B2 | 8/2015 | Jacques et al. | |
| 9,177,180 B2 | 11/2015 | Sano | |
| 9,361,494 B2 | 6/2016 | Swope et al. | |
| 9,367,785 B2 | 6/2016 | Sabesan et al. | |
| 9,477,865 B2 | 10/2016 | Koch et al. | |
| 2005/0110641 A1 | 5/2005 | Mendolia et al. | |
| 2005/0113138 A1 | 5/2005 | Mendolia et al. | |
| 2005/0280508 A1 | 12/2005 | Mravca et al. | |
| 2006/0181393 A1 | 8/2006 | Raphaeli | |
| 2007/0060802 A1 | 3/2007 | Ghevondian et al. | |
| 2007/0080787 A1 | 4/2007 | Taki et al. | |
| 2007/0096876 A1 | 5/2007 | Bridgelall et al. | |
| 2007/0141997 A1 | 6/2007 | Wulff et al. | |
| 2007/0273530 A1 | 11/2007 | Koezuka et al. | |
| 2008/0157934 A1 | 7/2008 | Posamentier | |
| 2008/0157970 A1 | 7/2008 | Single et al. | |
| 2008/0180221 A1 | 7/2008 | Tuttle | |
| 2008/0224828 A1 | 9/2008 | Ando et al. | |
| 2008/0297324 A1 | 12/2008 | Tuttle | |
| 2008/0318683 A1 | 12/2008 | Rofougaran et al. | |
| 2009/0002165 A1 | 1/2009 | Tuttle | |
| 2009/0073041 A1 | 3/2009 | Ferreol et al. | |
| 2009/0147625 A1 | 6/2009 | Pillai et al. | |
| 2009/0240120 A1 | 9/2009 | Mensinger et al. | |
| 2010/0039228 A1 | 2/2010 | Sadr et al. | |
| 2010/0123617 A1 | 5/2010 | Yu et al. | |
| 2010/0151810 A1 | 6/2010 | Grau Besoli et al. | |
| 2010/0188211 A1 | 7/2010 | Brommer et al. | |
| 2010/0207738 A1 | 8/2010 | Bloy | |
| 2010/0225480 A1 | 9/2010 | Bloy et al. | |
| 2010/0231410 A1 | 9/2010 | Seisenberger et al. | |
| 2010/0237995 A1 | 9/2010 | Iwahashi | |
| 2011/0006885 A1 | 1/2011 | Park et al. | |
| 2011/0018691 A1 | 1/2011 | Park et al. | |
| 2011/0050421 A1 | 3/2011 | Duron et al. | |
| 2011/0063095 A1 | 3/2011 | Tomiyama et al. | |
| 2011/0133891 A1 | 6/2011 | Krug et al. | |
| 2011/0169613 A1 | 7/2011 | Chen et al. | |
| 2011/0270045 A1 | 11/2011 | Lebel et al. | |
| 2012/0075073 A1 | 3/2012 | Fislage | |
| 2012/0139810 A1 | 6/2012 | Faraone et al. | |
| 2012/0189078 A1 | 7/2012 | Eom et al. | |
| 2012/0248187 A1 | 10/2012 | Piazza et al. | |
| 2012/0262358 A1 | 10/2012 | Wallner | |
| 2012/0314791 A1 | 12/2012 | Zhang et al. | |
| 2013/0021141 A1 | 1/2013 | Brommer et al. | |
| 2013/0099898 A1 | 4/2013 | Bloy | |
| 2013/0106671 A1 | 5/2013 | Eom et al. | |
| 2013/0113669 A1 | 5/2013 | Bellows | |
| 2013/0127620 A1 | 5/2013 | Siebers et al. | |
| 2013/0201003 A1 | 8/2013 | Sabesan et al. | |
| 2014/0104125 A1 | 4/2014 | Choiniere et al. | |
| 2014/0125459 A1 | 5/2014 | Sabahialshoara et al. | |
| 2014/0197928 A1 | 7/2014 | Jacques et al. | |
| 2014/0201423 A1 | 7/2014 | Jean et al. | |
| 2014/0266894 A1 | 9/2014 | Rasheed et al. | |
| 2014/0361078 A1 | 12/2014 | Davidson | |
| 2015/0087239 A1 | 3/2015 | Yang et al. | |
| 2015/0123869 A1 | 5/2015 | Bit-Babik et al. | |
| 2015/0169910 A1 | 6/2015 | Koch et al. | |
| 2015/0278565 A1 | 10/2015 | Bekritsky et al. | |
| 2015/0323662 A1 | 11/2015 | Swope et al. | |
| 2015/0358928 A1 | 12/2015 | Dural et al. | |
| 2016/0001803 A1 | 1/2016 | Kim et al. | |
| 2016/0003930 A1 | 1/2016 | Swope et al. | |
| 2016/0103198 A1* | 4/2016 | Swope | G01S 3/28 342/372 |
| 2016/0152350 A1 | 6/2016 | Puentes et al. | |
| 2017/0109555 A1 | 4/2017 | Koch et al. | |
| 2017/0177912 A1 | 6/2017 | Koch et al. | |
| 2018/0241487 A1* | 8/2018 | Li | H04W 16/14 |

FOREIGN PATENT DOCUMENTS

| | | |
|---|---|---|
| EP | 2020945 B1 | 2/2013 |
| WO | 1992/000531 A1 | 1/1992 |
| WO | 2008/082434 A2 | 7/2008 |
| WO | 2009/151778 A2 | 12/2009 |
| WO | 2011/135328 A2 | 11/2011 |
| WO | 2014/113363 A1 | 7/2014 |

OTHER PUBLICATIONS

Hajime Sakamoto and Peyton Z. Peebles, Jr., "Conopulse Radar" IEEE Transactions on Aerospace and Electronic Systems, vol. AES-14, No. 1 (Jan. 1978).

Haynes, "A Primer on Digital Beamforming," Spectrum Signal Processing, 15 pgs. (Mar. 26, 1998).

Spong, "An Efficient Method for Computing Azimuth and Elevation Angle Estimates from Monopulse Ratio Measurements of a Phased Array Pencil Beam Radar with Two-Dimensional Angle Steering", Radar Conference, 1999, The Record of the 1999 IEEE (Apr. 20, 1999).

EPC Global, EPC Radio-Frequency Identity Protocols Class-1 Generation-2 UHF RFID Protocol for Communications at 860MHz-960MHz, Version 1.2.0 (Oct. 23, 2008).

Patil et al., "An Emerging Anti Collision Protocol in RFID," 2010 National Conference on Advances in Recent Trends in Communication and Networks (Jan. 15-16, 2010).

International Search Report and Written Opinion for International Patent Application No. PCT/US2014/011411 dated Apr. 4, 2014.

International Search Report and Written Opinion for International Patent Application No. PCT/US2014/069112 dated Mar. 6, 2015.

International Search Report and Written Opinion for International Patent Application No. PCT/US2015/021486 dated Jun. 22, 2015.

International Search Report and Written Opinion for International Patent Application No. PCT/US2015/029423 dated Aug. 5, 2015.

International Search Report and Written Opinion for International Patent Application No. PCT/US2015/051444 dated Jan. 22, 2016.

International Search Report and Written Opinion for International Patent Application No. PCT/US2016/056333 dated May 9, 2017.

* cited by examiner

METHOD AND APPARATUS FOR RADIO FREQUENCY IDENTIFICATION (RFID) TAG BEARING ESTIMATION

BACKGROUND

Radio frequency identification (RFID) technology may be deployed in a variety of environments, including retail stores, warehouses and the like, to track various types of objects. A typical RFID system includes an RFID reader or interrogator, and a plurality of RFID tags. The tags are typically associated with objects (e.g. items of clothing, boxes of inventory or the like) within the environment, and may be physically attached to such items. The RFID reader is configured to emit a sequence of radio frequency (RF) interrogation signals, in different predefined directions. The direction of each interrogation signal is controlled by the RFID reader via the application of complex weights to each of a phased array of antenna elements, rather than via physical movement of the antenna elements.

At least one of the tags, upon receiving an interrogation signal, is configured to emit an RF response. The RFID reader, in turn, is configured to detect and demodulate the response, which may contain, for example, a stock keeping unit (SKU) code or other data identifying the object to which the tag is attached. In addition to demodulating the identifying data, the RFID reader may also be configured to estimate a bearing (e.g. elevation and azimuth relative to the RFID reader) of the tag from which the response was received, for location tracking of objects within the environment. The RFID reader may implement conventional digital beamforming techniques for bearing estimation; however, such bearing estimation techniques may still require two or more interrogations of each tag in the environment in order to arrive at a sufficiently accurate bearing estimation. The need for repeated tag interrogations slows location tracking, reducing the effectiveness of the system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Radio frequency identification (RFID) technology may be employed for object management, including location tracking, in a variety of environments. Typically, at least one RFID reader is deployed in environment such as a retail store, warehouse, or the like, in which a plurality of objects (e.g. articles of clothing, boxes, pallets, and the like) are located. Each object may have an RFID attached thereto. The RFID reader emits a sequence of interrogation beams sweeping over the area to be evaluated, for example via suitable beamforming control of a phased array of antenna elements. The antenna elements of the RFID reader receive a response from at least one tag reached by an interrogation beam, and prior to transmitting the next interrogation beam, the RFID reader processes the response to determine a bearing of the tag relative to the RFID reader. The receipt of the response alone indicates the general direction of the tag (i.e. within the area covered by the interrogation beam that prompted the tag response); however, that general direction is typically not sufficiently accurate.

In order to determine the bearing of the tag with greater accuracy, the RFID reader is configured to compute signal strength measurements (e.g. received signal strength indicators, RSSI) for each of a number of receive beam bearings that effectively sub-divide the coverage of the interrogation beam. The RFID reader is typically configured to compute the above-mentioned measurements via digital beamforming of the baseband signal obtained from the tag response. Specifically, the RFID reader is configured to simultaneously direct the signals from the above-mentioned antenna elements to each of a number of multiply-accumulate units (MAC units). Each MAC unit applies predetermined complex weights to the incoming antenna signals and generates a signal strength measurement for a particular receive beam bearing. The signal strength measurements for the receive beam bearings may then be employed to select a bearing for the tag. In a simple implementation, for example, the receive beam bearing having the greatest signal strength measurement is selected as the most likely direction of the tag relative to the RFID reader.

To achieve a sufficiently accurate estimation of the tag's bearing relative to the RFID reader, it is typically necessary to evaluate a substantial number of receive beam bearings, each of which requires a MAC unit as described above. Thus, in order to evaluate, for example, fifty receive beam bearings, the RFID reader may be equipped with fifty MAC units, each of which incrementally increases the complexity and cost of the RFID reader. Some conventional RFID readers, in an effort to reduce such complexity and cost, are implemented with a reduced number of MAC units. As a result, the RFID reader is unable to evaluate the complete set of receive beam bearings during the receipt of the tag response. The remaining receive beam bearings may only be evaluated following an additional interrogation beam directed at the same tag, and an additional response from that tag. In some cases, third, fourth, or further interrogations and responses of the same tag may be necessary to evaluate the desired number of receive beam bearings. Such repeated interrogations and responses significantly slow the operation of the RFID reader in locating tags, particularly in environments containing hundreds or thousands of RFID tags.

Examples disclosed herein are directed to method of radio frequency identification tag bearing estimation, comprising: at an RFID tag reader having a plurality of antenna elements, emitting a primary transmit beam; receiving a response signal from an RFID tag via the antenna elements; generating a first set of signal measurements corresponding to a first set of receive beam characteristics, based on a first partition of the response signal; generating a second set of signal measurements corresponding to a second set of receive beam characteristics, based on a second partition of the response signal; and combining the first and second sets of signal measurements, for selection of an estimated tag bearing for the RFID tag from the first and second receive beam characteristics.

Figure 1:
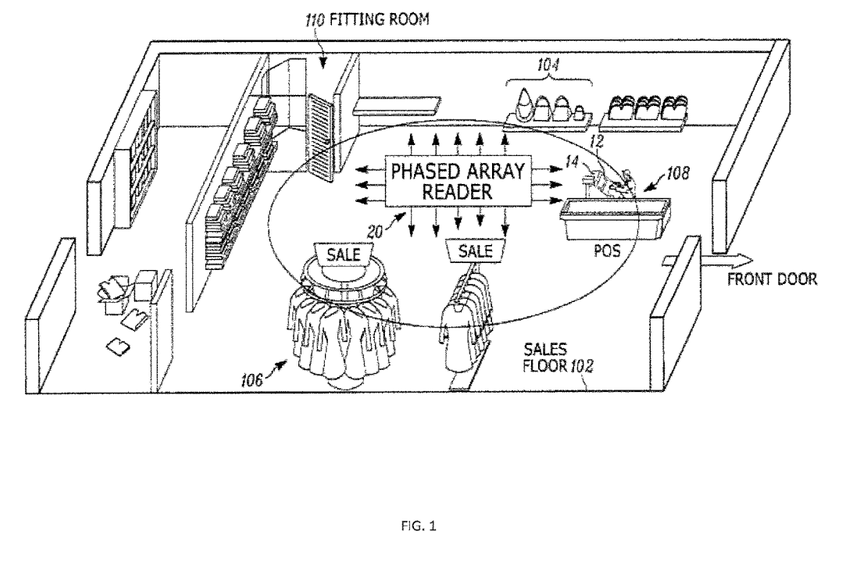
FIG. 1 is a schematic view of an environment in which an RFID reader and a plurality of RFID tags are deployed.

FIG. 1 depicts an environment 102 in the form of a retail sales floor including a point-of-sale (PoS) station 108 at which a server 12 and an input/output device 14 (e.g. a combination of a display and a keyboard) are provided. The server 12, in other examples, is located outside the sales floor 102 and is connected to the input/output device 14 and other components mentioned herein via a network (not shown).

Figure 2:
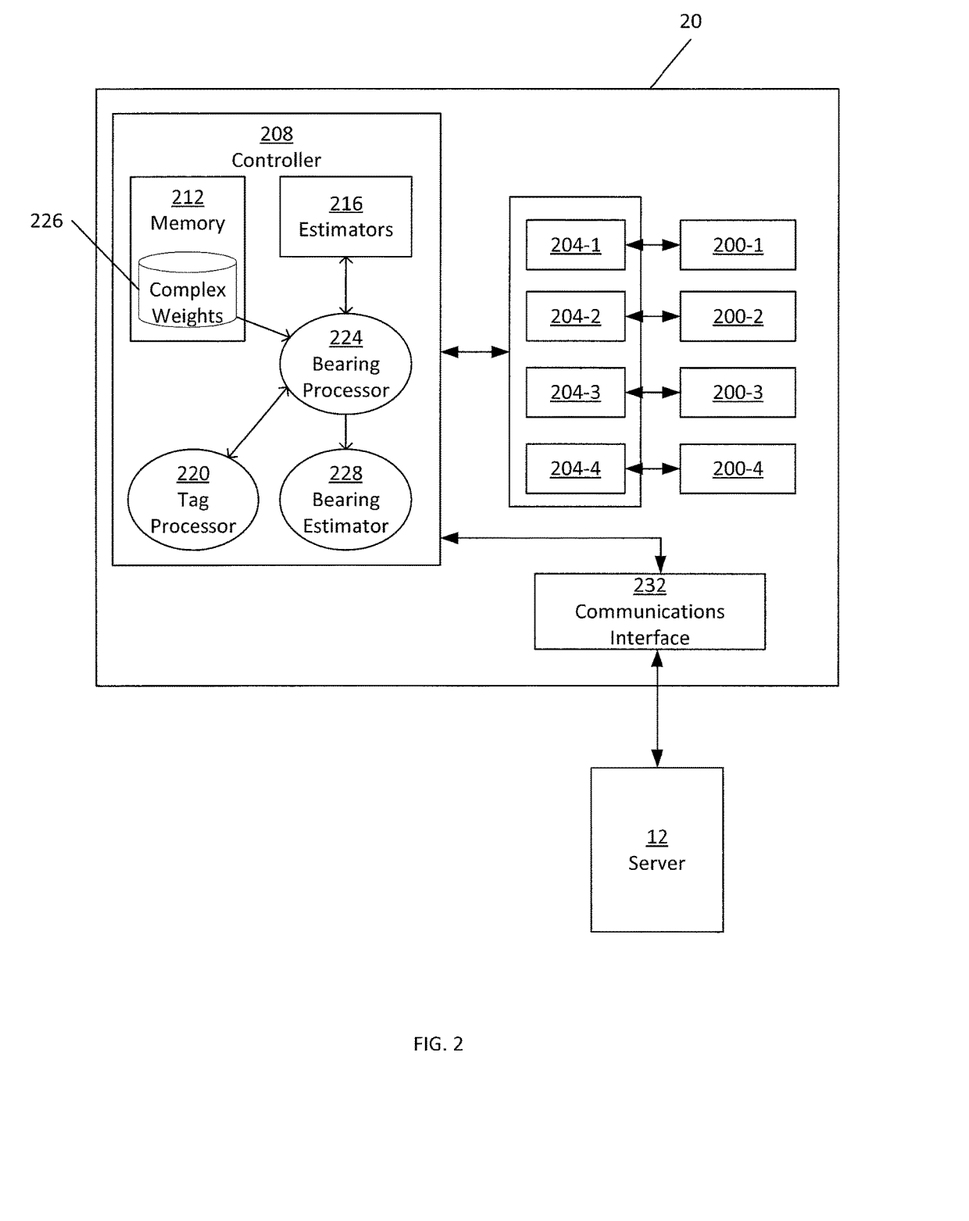
FIG. 2 is a block diagram of certain internal components of the RFID reader of FIG. 1.

The sales floor 102 also includes a fitting room 110, and a plurality of RFID-tagged objects, such as handbags 104, clothes 106 and the like. That is, each object 104, 106 has an RFID tag associated therewith, for example by physical attachment of the RFID tag to the object. In other examples, a group of objects are associated with a single RFID tag (e.g. a pallet of objects in a warehouse). Also deployed in the sales floor 102 is an RFID reader 20, which in the present example is located overhead, e.g. on the ceiling (not shown). In other examples, more than one RFID reader is deployed on the sales floor 102. The RFID reader 20 need not be mounted on the ceiling in other examples. As seen in FIG. 2, the RFID reader includes a phased array of antenna elements, to be discussed below in greater detail.

The server 12 includes one or more computing devices (e.g. desktop computers, tablet computers, smartphones, and the like) in wired, wireless, direct, or networked communication with the interface 14 and with the RFID reader 20. The input/output device 14 can be controlled by the server 12 to present information such as representations of bearings of the RFID-tagged objects 104, 106, as determined by one or both of the RFID reader 20 and the server 12.

The RFID reader 20 is configured, as will be discussed below, to control the phased array of antenna elements to emit primary transmit beams (also referred to as interrogation beams) directed to various regions within the environment 102. The RFID reader 20 is further configured to receive responses from the above-mentioned RFID tags, and to process the responses to generate signal measurements (e.g. signal strength measurements) corresponding to receive beam characteristics (e.g. receive beam bearings, also referred to herein as receive beam angles) for use in selecting a bearing of the tag that generated the response relative to the RFID reader 20.

Turning to FIG. 2, certain components of the RFID reader 20 are illustrated. In particular, as noted above, the RFID reader 20 includes a phased array of antenna elements 200. In particular, the example shown in FIG. 2 includes four antenna elements 200-1, 200-2, 200-3 and 200-4. In other examples, the phased array of antenna elements 200 includes a number of antenna elements 200 that is greater than two but smaller than four; in further examples, the phased array of antenna elements 200 includes more than four antenna elements 200. In an example implementation (not shown), the RFID reader includes fourteen antenna elements 200.

The RFID reader 20 also includes a plurality of RF transceivers 204. In some embodiments, the number of transceivers 204 is equal to the number of antenna elements 200. Thus, as illustrated in FIG. 2, the RFID reader 20 includes four transceivers 204-1, 204-2, 204-3 and 204-4. In other examples, a different (e.g., smaller) number of transceivers 204 are deployed than the number of antenna elements. Each transceiver 204 is paired with an antenna element 200, and is configured to operate the corresponding antenna element 200 to transmit and/or receive data. In a transmission mode, for example, the transceivers 204 each receive data for transmission, process and modulate the data, and route the modulated signals to their respective antenna elements 200. In a reception mode, the transceivers 204 each receive an RF signal (e.g. along a conductive trace) from their respective antenna elements 200. Each transceiver demodulates and digitizes the RF signal for routing to other components of the RFID reader 20 for further processing.

The RFID reader 20 also includes a special-purpose controller, shown as a controller 208 in FIG. 2, specifically designed to control the components of the RFID reader 20 (e.g. the transceivers 204 and by extension the antenna elements 200) to emit primary transmit beams, receive tag responses, and generate signal measurements from the tag responses for use in bearing estimation for the tags. The controller 208 includes a non-transitory computer readable storage medium, such as a memory 212, which is illustrated as being embedded within the controller 208. The memory 212 includes one of, or a combination of, volatile memory (e.g. Random Access Memory or RAM) and non-volatile memory (e.g. read only memory or ROM, Electrically Erasable Programmable Read Only Memory or EEPROM, flash memory). In other examples, the memory 212 is a discrete component interconnected with the controller 208, or a combination of embedded and discrete memory components. The controller 208 also includes a plurality of estimators 216, as will be discussed in greater detail below.

The controller 208, the memory 212 and the estimators 216 are implemented as one or more integrated circuits (ICs). The controller 208 is implemented in some examples as a specially designed integrated circuit, such as a field-programmable gate array (FPGA), and the memory 212 and the estimators 216 are components of the above-mentioned FPGA. In other examples, the controller 208 is implemented as a plurality of discrete components, including one or more FPGAs or other IC components. In some examples, the controller 208 is implemented as a digital signal processor (DSP) and an FPGA. In one such example, a tag processor 220 and a bearing estimator 228, discussed in greater detail below, are implemented within the DSP, while the estimators 216 and a bearing processor 224, described below, are implemented within the FPGA. In some examples, the estimators 216 and the repository 226 of complex weights may be provided as components of the bearing processor 224 within the above-mentioned FPGA.

The controller 208 is configured to execute one or more applications, each of which may be implemented as executable instructions stored in the memory 212 or as specifically configured hardware components in the controller 208. In particular, the controller 208 is configured to execute a tag processor 220 to control the transceivers 204 to emit interrogation beams, and to process data such as object identifiers obtained from tag responses. The controller 208 is further configured to execute a bearing processor application 224, configured to receive tag response signals from the transceivers 204 and to control the estimators 216 to generate signal measurements from the response signals, based on a set of complex weights 226, also referred to herein as weighting factors 226, that are stored in the memory 212. The generation of signal measurements by the bearing processor 224 will be described in detail herein. The signal measurements generated by the bearing processor 224 are provided, in this example, to a bearing estimator 228, configured to process the signal measurements to estimate a bearing—for example, an elevation angle and an azimuth—of the tag relative to the RFID reader 20. The bearing estimator 228 may be configured to pass the selected bearing to the tag processor 220 for further processing (e.g. for transmission of the tag bearing to the server 12). The bearing processor 224 is also configured to provide primary tag response signals (also referred to as primary receive beams) to the tag processor 220 for further processing, and to receive data for transmission to the transceivers 204 from the tag processor 220.

The functionality of the above-mentioned applications may also be combined into a single application, or a different set of applications than those shown in FIG. 2. Further, in some examples certain functionality, such as that provided by the bearing estimator, may be implemented in the server 12, rather than the controller 208 of the RFID reader 20. In further examples, certain functionality may be implemented at another controller, such as a host controller (not shown) residing between the controller 208 and the communications interface 232.

The RFID reader 20 also includes a communications interface 232 interconnected with the controller 208. The communications interface 232 includes suitable hardware (e.g. transmitters, receivers, network interface controllers and the like) allowing the server RFID reader 20 to communicate with other computing devices, such as the server 12. The communications link established between the RFID reader 20 and the server 12 may be a direct link, or a link that traverses one or more networks, including both local and wide-area networks. The specific components of the communications interface 232 are selected based on the type of network or other links that the RFID reader 20 is required to communicate over.

Figure 3:
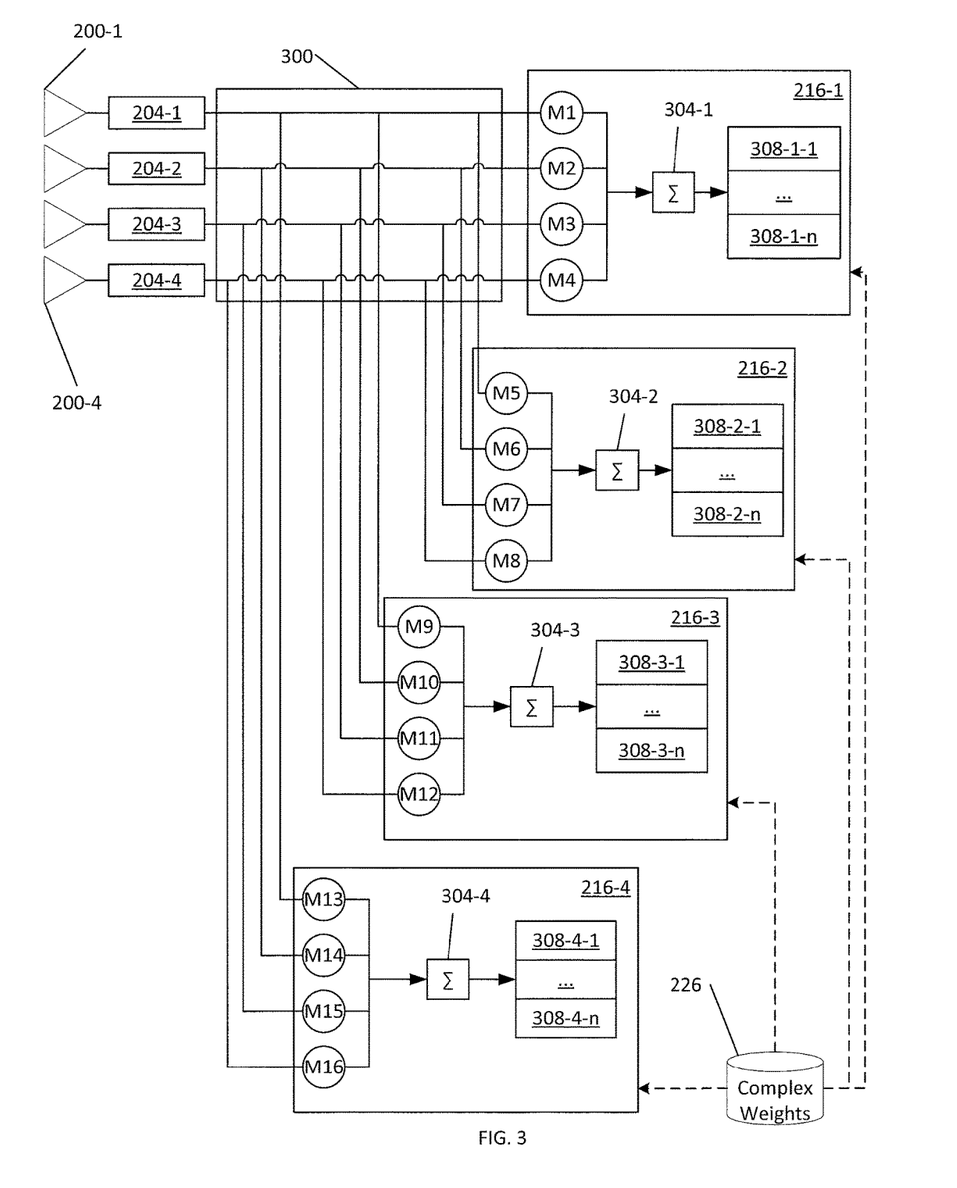
FIG. 3 is a block diagram of further internal components of the RFID reader of FIG. 1.

Referring now to FIG. 3, the estimators 216 and certain associated components of the controller 208 are shown in greater detail. In particular, four estimators 216-1, 216-2, 216-3 and 216-4 are shown connected with the transceivers 204 via a splitter 300. In other examples, a larger number of estimators 216 than the four shown are provided. In further examples, a smaller number of estimators 216 is provided. More generally, the number of estimators 216 need not equal the number of antenna elements.

Each estimator 216 includes a plurality of multipliers (e.g. implemented as circuits within the controller 208) equal in number to the number of antenna elements 200 provided in the RFID reader 20. Thus, the estimator 216-1 includes the multipliers M1-M4, the estimator 216-2 includes the multipliers M5-M8, the estimator 216-3 includes the multipliers M9-M12, and the estimator 216-4 includes the multipliers M13-M16. Each multiplier is configured to receive samples of a baseband signal from a transceiver 204, to multiply each received sample by a complex weighting factor, and to route the result of the multiplication to an adder 304 included in each estimator 216. Each set of multipliers M1-M4, M5-M8, etc., through the application of a set of complex weighting factors as discussed below, generates one signal measurement used to estimate a bearing.

As noted above, each estimator 216 also includes an adder 304 (therefore adders 304-1, 304-2, 304-3 and 304-4 are shown in FIG. 3) configured to receive and sum the output of the multipliers M of the respective estimator 216. Each estimator 216 also includes an accumulator or a plurality of accumulators 308, which may be implemented, for example, as registers in the memory 212. In the illustrated example, the estimator 216-1 includes accumulators 308-1-1, . . . , 308-1-$n$; the estimator 216-2 includes accumulators 308-2-1, . . . , 308-2-$n$; the estimator 216-3 includes accumulators 308-3-1, . . . , 308-3-$n$; and the estimator 216-4 includes accumulators 308-4-1, . . . , 308-4-$n$. The number of accumulators 308 implemented in connection with each estimator 216 is determined based on the number of signal measurements to be generated by that estimator 216. Therefore, each estimator 216 need not have the same number of accumulators 308 as the other estimators 216, and the number of accumulators 308 associated with a given estimator 216 need not equal the number of antenna elements 200 or estimators 216. As will now be apparent to those skilled in the art, the estimators 216 may also be referred to as multiply-accumulators (or MAC units), albeit with the capability to simultaneously generate a plurality of accumulations.

As will be described below in greater detail, the bearing processor 224 is configured to route baseband signals—generated by the transceivers 204 and corresponding to an RF tag response received at the antenna elements 200—to each of the estimators 216, and more specifically, to the multipliers M of the estimators 216. The bearing processor 224 is further configured to control the multipliers M of each estimator 216 to apply weighting factors retrieved from the complex weights repository 226 in the memory 212. In particular, as will be seen below, the bearing processor 224 controls the multipliers of each estimator 216 to apply a plurality of different sets of weighting factors during the receipt of a single tag response, thus permitting the generation of a plurality of signal measurements from the single tag response.

Figure 4:
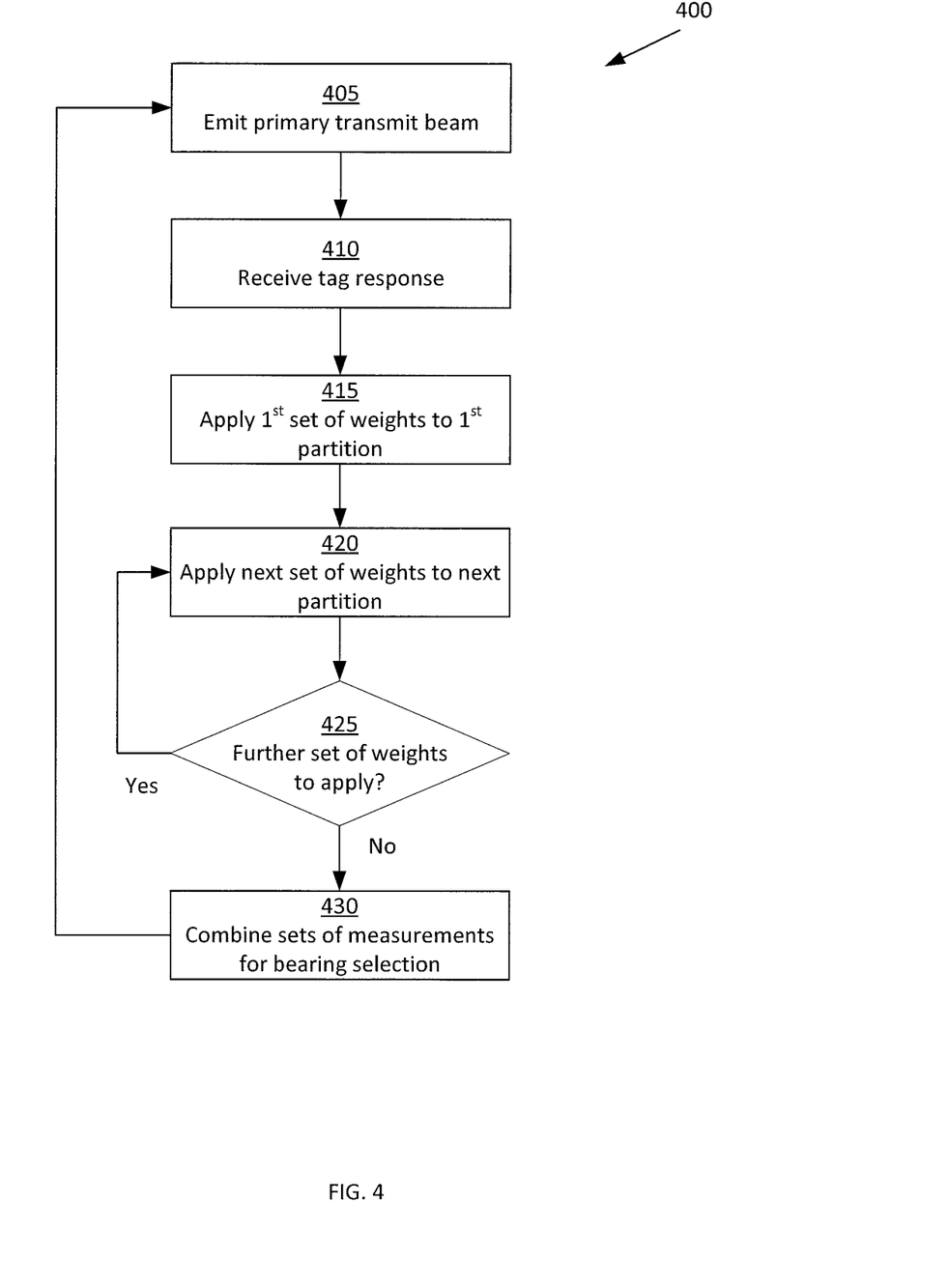
FIG. 4 is a method of RFID tag bearing estimation.

Referring now to FIG. 4, a method 400 of RFID tag bearing estimation is illustrated. The method 400 will be described in conjunction with its performance by the RFID reader 20 as described above.

Figure 5:
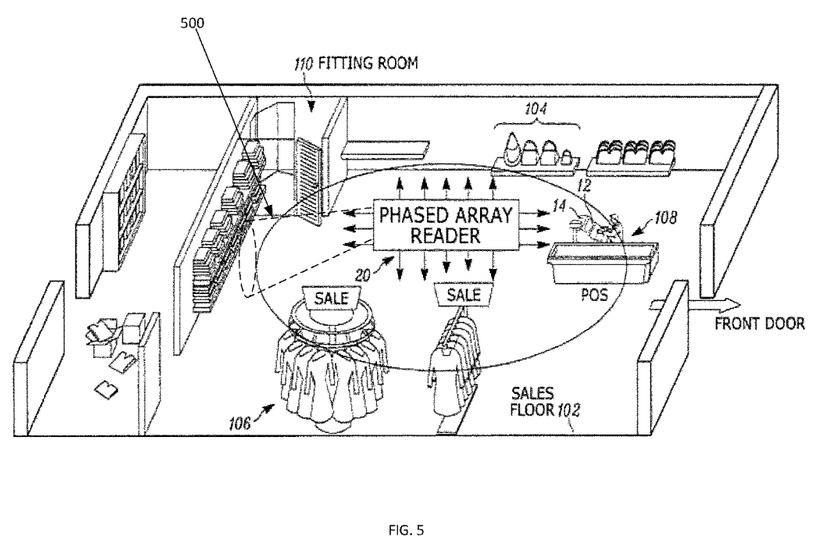
FIG. 5 is a schematic view of the environment of FIG. 1 during the performance of the method of FIG. 4.

Beginning at block 405, the RFID reader 20 is configured to emit a primary transmit beam (i.e. an interrogation beam). In particular, the tag processor 220 is configured to select a bearing for the primary transmit beam, and to send both the selected bearing and the data to be contained in the primary transmit beam to the transceivers 204 for encoding, modulation and emission via the antenna elements 200. As will be apparent, complex weights are typically applied to the primary transmit signal sent by the tag processor 220 in order to steer the primary transmit beam to the selected bearing. Various mechanisms may be employed to steer the primary transmit beam, including the application of complex weights within the transceivers 204 themselves, which may store complex weights corresponding to each predetermined primary transmit beam bearing. Turning briefly to FIG. 5, the sales floor 102 is shown during the performance of block 405, and a primary transmit beam 500 is illustrated.

At block 410, the RFID reader 20 is configured to receive a response to the primary transmit beam from an RFID tag (e.g. attached to one of the articles of clothing impacted by the primary transmit beam 500 shown in FIG. 5). The response is emitted from the RFID tag and detected at the antenna elements 200. The transceivers 204 are configured to receive the RF signals from their respective antenna elements 200 over signal paths such as circuit traces. In the present example, the transceivers 204 are configured to demodulate and digitize the response signals received from their respective antenna elements. The transceivers 204 are then configured to route the samples of the resulting digital baseband signal over a plurality of signal paths to the tag processor 220 and to the estimators 216 via the bearing processor 224. In particular, as seen in FIG. 3, the response signals are routed (via the splitter 300) such that each estimator 216 receives the response signal samples from the transceivers 204. More specifically, each multiplier M in a given estimator 216 receives the response signal corresponding to one of the antenna elements 200. Thus, for instance, the multiplier M11 receives the response signal obtained from the antenna element 200-3.

At block 415, the bearing processor 224 is configured to generate a first signal measurement, corresponding to a first receive beam characteristic, based on a first partition of the response signal. The receive beam characteristic includes at least one of a receive beam angle (i.e. a receive beam bearing, or elevation angle and azimuth) and a receive beam polarization. In the case of a receive beam angle, the first signal measurement is, in this example, a signal strength measurement such as an RSSI value for a given receive beam angle.

As will now be apparent, a signal strength measurement for a given receive beam angle is generated by the bearing processor 224 by controlling one of the estimators 216 to apply, via the multipliers M of that estimator 216, a set of predetermined weighting factors corresponding to the receive beam angle. The bearing processor 224 is configured to retrieve the set of weighting factors from the repository of complex weights 226 for application at the relevant estimator 216.

At block 420, the bearing processor 224 is configured to generate an additional signal measurement, corresponding to an additional receive beam characteristic, based on an additional partition of the response signal. As noted earlier, the receive beam characteristic includes at least one of a receive beam angle (i.e. a receive beam bearing, or elevation angle and azimuth) and a receive beam polarization. The generation of the additional signal measurement is performed at the bearing processor 224 by controlling the above-mentioned estimator 216 (that is, the same estimator 216 employed to generate the first signal measurement) to apply a different set of predetermined weighting factors retrieved from the repository 226.

As noted above, the generation of the first signal measurement and the additional (second, in the present example performance of the method 400) signal measurement are each based on respective partitions of the tag response, rather than on the entire tag response. In other words, a single estimator 216 is controlled by the bearing processor 224 to apply two or more distinct sets of weighting factors, to two or more distinct portions of the tag response, to generate two or more distinct signal measurements, which in turn correspond to two or more distinct receive beam characteristics (e.g. receive beam angles). The partitioning of the response signal will be discussed in greater detail below.

At block 425, the bearing processor 224 is configured to determine whether additional sets of complex weights are to be applied to the response signal. When the determination is negative, the performance of the method 400 proceeds to block 430, at which the bearing processor 224 is configured to send the first and second signal measurements to the bearing estimator 228, for selection of an estimated tag bearing for the RFID tag from the first and second receive beam characteristics. For example, the combined signal measurements may be provided to the bearing estimator 228 for selection of a tag bearing. In a simplified example, the bearing estimator 228 is configured to select the greatest signal strength measurement received from the bearing processor 224, and to then select as a tag bearing the receive beam characteristic (e.g. the receive beam angle) corresponding to that signal strength measurement.

When the determination at block 425 is positive, the bearing processor 224 instead repeats the performance of block 420, controlling the estimator 216 to apply a further (third, in this example performance of the method 400) set of weighting factors to a further partition of the response signal. The performance of blocks 425 and 420 may be repeated until all the predetermined weighting factors in the repository 226 have been applied to respective partitions of the response signal.

Following the performance of block 430, the performance of the method 400 may be repeated, beginning with the emission of another primary transmit beam having a bearing other than the primary transmit beam 500 shown in FIG. 5.

Figure 6:
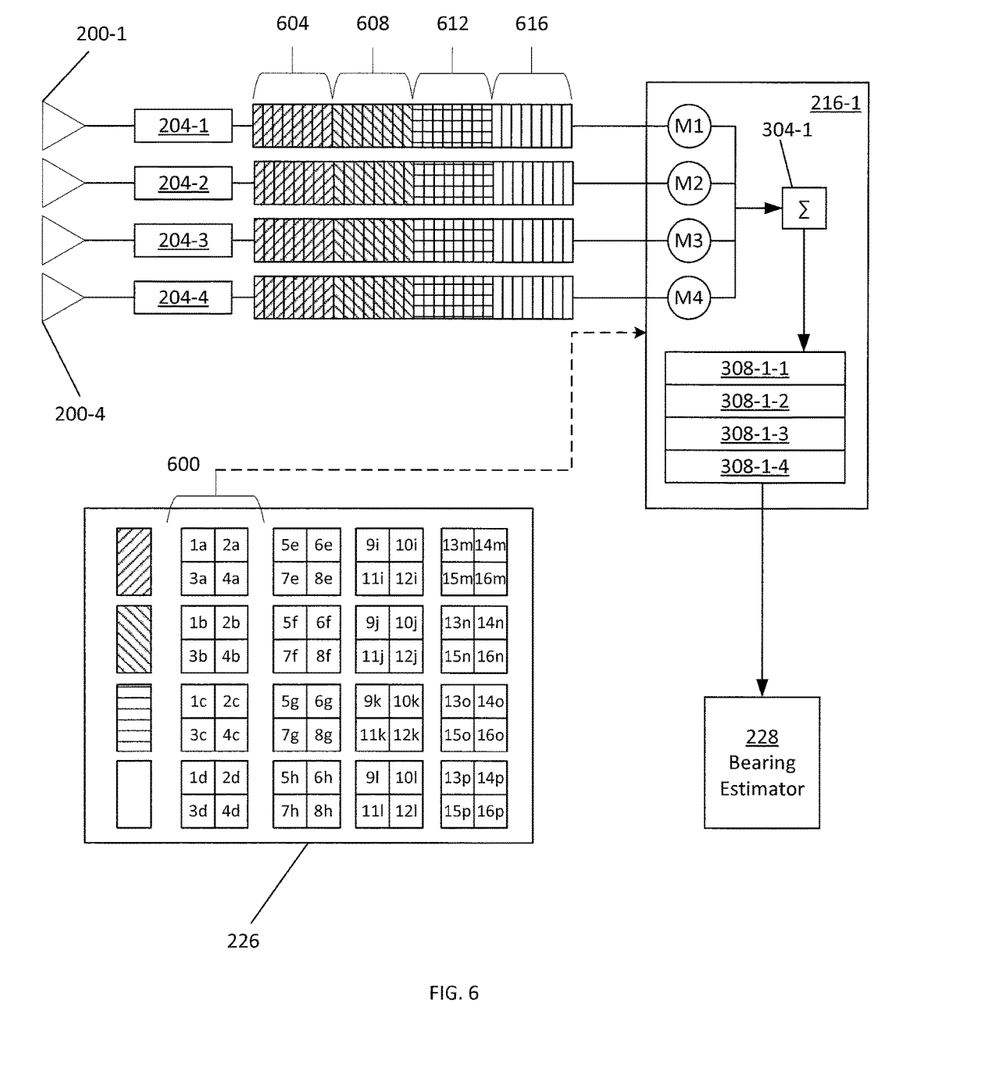
FIGS. 6 and 7 illustrate alternative mechanisms for signal partitioning during the performance of the method of FIG. 4.

Turning to FIG. 6, partitioning of the response signal and generation of signal measurements at blocks 415 and 420 will be described in greater detail, according to some examples. The response signal, as noted earlier, is digitized by the transceivers 204, and is therefore routed to the multipliers of the estimator 216-1 (which is shown in isolation in FIG. 6) via the splitter 300 (not shown in FIG. 6) as a plurality of digital samples. More specifically, each transceiver generates a plurality of samples from the RF signal received from the corresponding antenna element 200. Four sets of samples are illustrated in FIG. 6, each from one of the transceivers and provided one sample at a time to a corresponding multiplier M. The number of samples available, as will be apparent to those skilled in the art, is determined by the length of the response signal and the sample rate of the digital converters within the transceivers 204.

The complex weights 226 are also illustrated in FIG. 6. Specifically, the complex weights 226 include four sets 600 of weighting factors for use by the bearing processor 224 in controlling the multipliers M1-M4 of the estimator 216-1. The bearing processor 224 is configured to partition the response signal and generate signal measurements from the partitions. In the present example, given that there are four sets (1$a$-4$a$, 1$b$-4$b$, 1$c$-4$c$ and 1$d$-4$d$) of weighting factors, the bearing processor 224 is configured to control the estimator 216 to apply different weighting factors to each of four partitions 604, 608, 612 and 616 of the response signal. The partition 604 is assumed to be the first partition in the response signal, while the partition 616 is assumed to be the last partition in the response signal (i.e. received at the antenna elements 200 at a later time than the first partition 604).

To generate signal measurements, the bearing processor 224 is configured to retrieve the weighting factors 1$a$, 2$a$, 3$a$ and 4$a$ and to control the multipliers M1, M2, M3 and M4 respectively to apply those weighting factors to the samples of the first partition 604. Therefore, the multipliers M compute the product of each sample in the partition 604, and the adder sums the four resulting products and adds the sum to the first accumulator 308-1-1. The first accumulator 308-1-1, when each of the samples in the first partition 604 have been processed, contains a signal measurement (e.g. an RSSI value) corresponding to a receive beam characteristic to which the weighting factors 1a-4a also correspond. At this point, the accumulators 308-1-2, 308-1-3 and 308-1-4 are empty.

The bearing processor 224 is configured, when the first partition 604 has been processed (e.g. when the bearing processor detects that one quarter of the expected sample count has been processed), to retrieve the next set of weighting factors—1b, 2b, 3b and 4b—and to apply those weighting factors to the multipliers M1-M4 during the receipt of the samples of the second partition 608. The above process is repeated, with the exception that the bearing processor 224 also controls the estimator 216-1 to direct the output of the adder 304-1 to the second accumulator 308-1-2. Thus, when the samples of the second partition 608 have been processed, the accumulator 308-1-1 contains the above-mentioned first signal measurement, and the accumulator 308-1-2 contains a second signal measurement derived from the partition 608 (e.g. a second RSSI value).

The above process is repeated by the bearing processor 224 (i.e. by repeating the performances of blocks 420 and 425) to generate a third signal measurement, stored in the accumulator 308-1-3 and generated by applying the weighting factors 1c-4c to the multipliers M1-M4 during the receipt of the partition 612. The above process is then repeated yet again by the bearing processor 224 to generate a fourth signal measurement, stored in the accumulator 308-1-4 and generated by applying the weighting factors 1d-4d to the multipliers M1-M4 during the receipt of the partition 616.

From the above, it will be apparent that the estimator 216-1 generates, from a single response signal, four distinct signal measurements, such as RSSI values each corresponding to a different receive beam characteristic (e.g., angle or polarization). As will now be apparent, with reference to FIGS. 3 and 6, the splitter 300 permits the partitions 604, 608, 612 and 616 to also be simultaneously directed to the three other estimators 216-2, 216-3 and 216-4. Further, the complex weights repository 226, as shown in FIG. 6, contains additional sets of weighting factors for each of the above-mentioned estimators. For example, the bearing processor 224 is configured, simultaneously with the generation of the four signal measurements described above by the estimator 216-1, to control the estimator 216-2 to generate an additional four signal measurements from the partitions 604, 608, 612 and 616. In particular, the bearing processor 224 is configured to apply the weighting factors 5e-8e to the partition 604, the weighting factors 5f-8f to the partition 608, the weighting factors 5g-8g to the partition 612, and the weighting factors 5h-8h to the partition 616. Similarly, the bearing processor 224 is configured to simultaneously apply the weighting factors 9i-12l to the estimator 216-3, and the weighting factors 13m-16p to the estimator 216-4.

Therefore, in the example implementation shown in the drawings, a set of four signal measurements is generated by each estimator 216, for each partition of the response signal. Therefore, the response signal is processed to generate a total of sixteen signal measurements, permitting the controller 208 to evaluate sixteen different receive beam characteristics where a conventional RFID reader with an equivalent hardware configuration (i.e. with four estimators as shown in FIG. 3) can evaluate only four receive beam characteristics.

Figure 7:
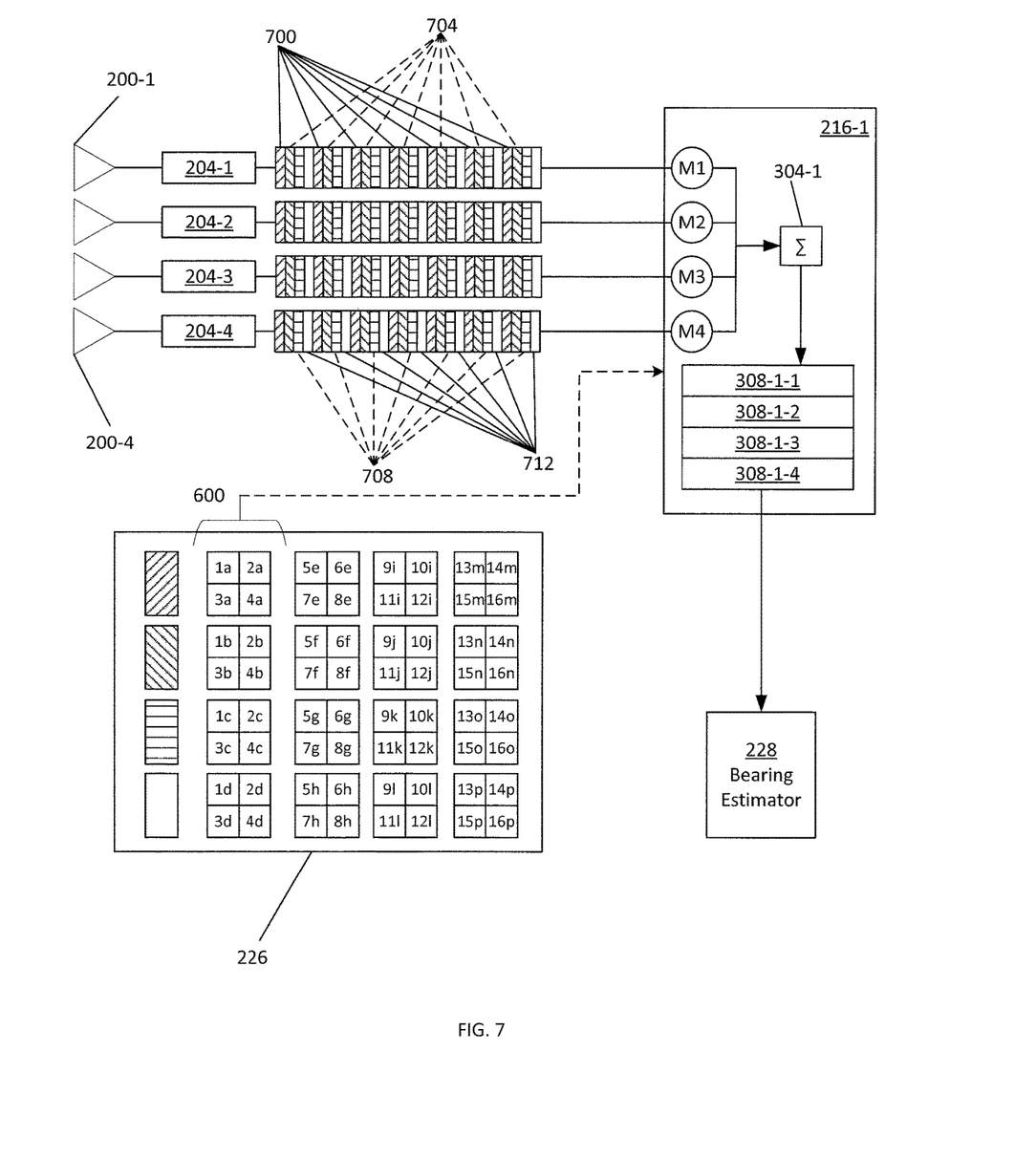

Turning to FIG. 7, another method of partitioning the response signal is illustrated. Whereas in the example of FIG. 6, the bearing processor 224 partitioned the response signal into contiguous segments corresponding to adjacent time periods, in the example of FIG. 7 the bearing processor 224 is configured to partition the response signal into interleaved subsets of samples. Four subsets of samples 700, 704, 708 and 712 are illustrated in FIG. 7 as being interleaved with one another. To generate the signal measurements in the example of FIG. 7, rather than determine a number of samples for each partition, the bearing processor 224 is configured to alternate between sets of weighting factors with each sample. Thus, for example, the weighting factors 1a-4a are applied to the first sample, the weighting factors 1b-4b are applied to the second sample, the weighting factors 1d-4d are applied to the fourth sample, and so on. The implementation shown in FIG. 7 may be less vulnerable to time-based variations in response signal amplitude, and may therefore produce more reliable signal measurements.

In other examples having additional estimators 216, greater numbers of signal measurements may be generated than the sixteen discussed above. In addition, the number of partitions defined in the response signal by the bearing processor 224 can be increased to yield additional signal measurements corresponding to additional receive beam characteristics. The selection of an appropriate number of partitions (and therefore a corresponding number of weighting factor sets) balances the ability to obtain a greater number of signal measurements against the accuracy of those signal measurements, which may suffer if the response signal is partitioned to such a degree that the effective sampling rate for each signal measurement falls below the Nyquist rate. For example, assume that the transceivers 204 have a sampling rate of 2.4 MHz, and that the bandwidth of the response signal is 300 kHz. In order to accurately sample the response signal, a sample rate of about 600 kHz is sufficient. Therefore, the response signal (sampled at 2.4 MHz) can be divided into four partitions with minimal effects on signal measurement accuracy. A greater number of partitions may also be employed, although the accuracy of the resulting signal measurements may suffer.

In still other examples, the segmented and interleaved approaches discussed above may be combined. For example, partitions may be interleaved in blocks of two or more samples rather than the single-sample interleaving shown in FIG. 7.

In other examples, one or more of the partitions may be discarded rather than employed to generate measurements as discussed above. For example, all but one of the partitions (e.g. the partition 700 shown in FIG. 7) may be discarded, and the partition that is retained may be applied to each of the estimators 216. A set of signal measurements corresponding to receive beam characteristics may therefore be generated with a reduced volume of sample data, thus reducing the sample storage requirement and simplifying the logic, especially in FPGA-based estimators.

Figure 8:
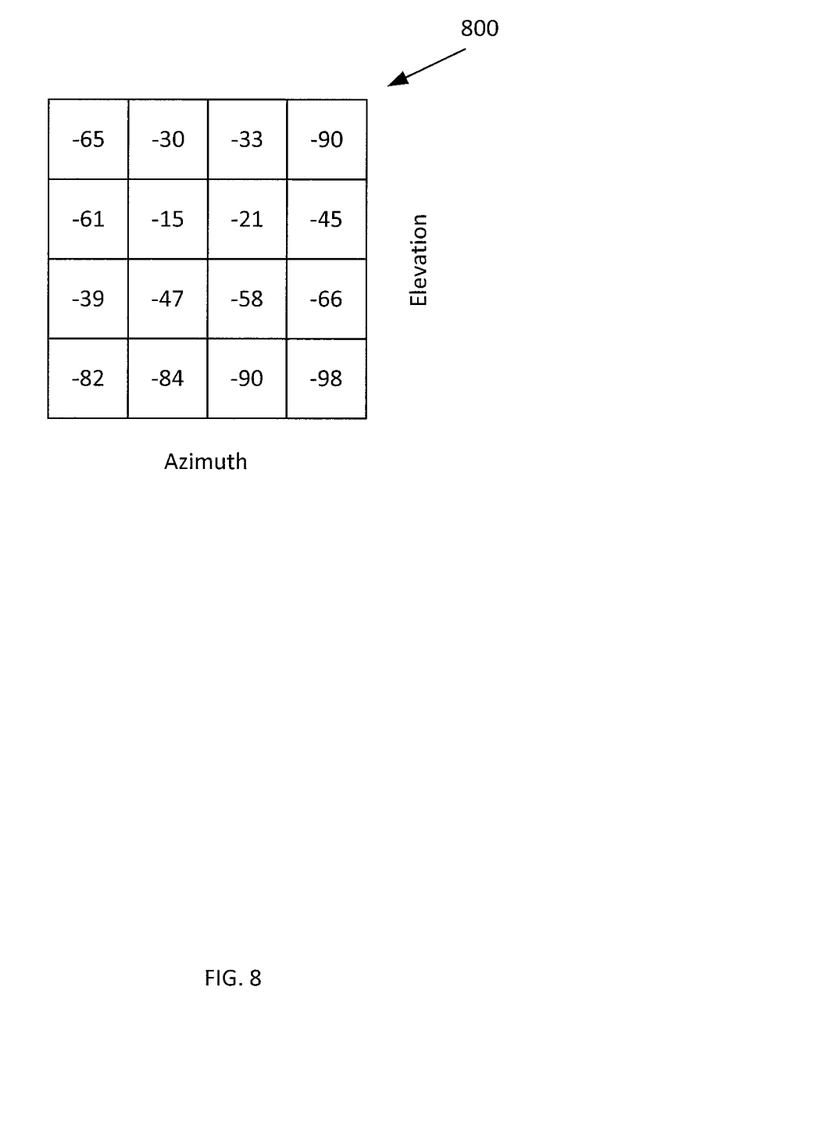
FIG. 8 is a heat map of signal measurements generated via the performance of the method of FIG. 4.

The signal measurements generated during the performance of the method 400 may be provided to the bearing estimator 228 for further processing to select a tag bearing, and represent a heat map of signal measurements corresponding to respective receive beam characteristics. For example, FIG. 8 depicts a set of sixteen RSSI values generated from the tag response, each corresponding to a different receive beam angle. The receive beam angles may cover subsets of a sector 800 covered by the primary transmit beam 500.

In some examples, the bearing processor 224 processes only a portion of the response signal. For example, the bearing processor 224 can be configured to partition and process only the preamble of the response signal. In such embodiments, at block 405 the RFID reader 20 can be configured to include a request for an extended preamble in the primary transmit signal, to increase the number of preamble samples available to the bearing processor 224.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of radio frequency identification (RFID) tag bearing estimation, comprising:
   at an RFID tag reader having a plurality of antenna elements, emitting a primary transmit beam;
   receiving a response signal from an RFID tag via the antenna elements;
   generating a first set of signal measurements corresponding to a first set of receive beam characteristics, based on a first partition of the response signal;
   generating a second set of signal measurements corresponding to a second set of receive beam characteristics, based on a second partition of the response signal; and
   combining the first and second sets of signal measurements, for selection of an estimated tag bearing for the RFID tag from the first and second receive beam characteristics.

2. The method of claim 1, wherein the first and second sets of signal measurements include a signal strength measurement for the respective partitions of the response signal.

3. The method of claim 1, wherein the first and second sets of receive beam characteristics include at least one of a receive beam angle and a receive beam polarization.

4. The method of claim 1, wherein receiving the response signal comprises receiving the response signal over a plurality of signal paths corresponding to respective antenna elements;
   wherein generating the first set of signal measurements comprises applying a first set of weighting factors to the plurality of signal paths during the first partition of the response signal; and wherein generating the second set of signal measurements comprises applying a second set of weighting factors to the plurality of signal paths during the second partition of the response signal.

5. The method of claim 4, wherein receiving the response signal further comprises receiving a plurality of response signal samples over the plurality of signal paths;
the first partition of the response signal comprising a first subset of the plurality of samples; and
the second partition of the response signal comprising a second subset of the plurality of samples distinct from the first subset.

6. The method of claim 5, wherein the samples of the first subset are contiguous over an initial time period, and wherein the samples of the second subset are contiguous over a subsequent time period.

7. The method of claim 5, wherein the samples of the first subset are interleaved with the samples of the second subset.

8. The method of claim 5, wherein generating the first set of signal measurements further comprises routing the samples of the first subset via the signal paths to respective estimators, and controlling the estimators to apply the first set of weighting factors; and
wherein generating the second set of signal measurements further comprises routing the samples of the second subset via the signal paths to the estimators, and controlling the estimators to apply the second set of weighting factors.

9. The method of claim 8, wherein the estimators include a plurality of multipliers.

10. The method of claim 9, further comprising directing the output of the multipliers to an adder for generating the first and second sets of signal measurements.

11. The method of claim 1, further comprising:
generating a third set of signal measurements corresponding to a third set of receive beam characteristics, based on a third partition of the response signal.

12. A radio frequency identification (RFID) tag reader, comprising:
an array of antenna elements;
a plurality of RF transceivers connected to respective ones of the antenna elements;
a controller in communication with the RF transceivers, the controller including:
a tag processor configured to control the transceivers to emit, via the array of antenna elements, a primary transmit beam;
a bearing processor configured to receive a response signal from an RFID tag via the antenna elements, and to generate (i) a first set of signal measurements corresponding to a first set of receive beam characteristics, based on a first partition of the response signal, and (ii) a second set of signal measurements corresponding to a second set of receive beam characteristics, based on a second partition of the response signal; and
a bearing estimator configured to combine the first and second sets of signal measurements, for selection of an estimated tag bearing for the RFID tag from the first and second sets of receive beam characteristics.

13. The RFID tag reader of claim 12, wherein the first and second sets of signal measurements include a signal strength measurement for the respective partitions of the response signal.

14. The RFID tag reader of claim 12, wherein the first and second sets of receive beam characteristics include at least one of a receive beam angle and a receive beam polarization.

15. The RFID tag reader of claim 12, the bearing processor configured to:
receive the response signal over a plurality of signal paths corresponding to respective antenna elements;
generate the first set of signal measurements by applying a first set of weighting factors to the plurality of signal paths during the first partition of the response signal; and
generate the second set of signal measurements by applying a second set of weighting factors to the plurality of signal paths during the second partition of the response signal.

16. The RFID tag reader of claim 15, the bearing processor configured to receive the response signal as a plurality of response signal samples over the plurality of signal paths;
the first partition of the response signal comprising a first subset of the plurality of samples; and
the second partition of the response signal comprising a second subset of the plurality of samples distinct from the first subset.

17. The RFID tag reader of claim 16, wherein the samples of the first subset are contiguous over an initial time period, and wherein the samples of the second subset are contiguous over a subsequent time period.

18. The RFID tag reader of claim 16, wherein the samples of the first subset are interleaved with the samples of the second subset.

19. The RFID tag reader of claim 16, the bearing processor configured to:
generate the first set of signal measurements by routing the samples of the first subset via the signal paths to respective estimators, and controlling the estimators to apply the first set of weighting factors; and
generate the second set of signal measurements by routing the samples of the second subset via the signal paths to the estimators, and controlling the estimators to apply the second set of weighting factors.

20. The RFID tag reader of claim 19, wherein the estimators include a plurality of multipliers.

21. The RFID tag reader of claim 20, the bearing processor configured to direct the output of the multipliers to an adder for generating the first and second sets of signal measurements.

22. The RFID tag reader of claim 12, the bearing processor further configured to generate a third set of signal measurements corresponding to a third set of receive beam characteristics, based on a third partition of the response signal.

* * * * *